April 29, 1924.
J. B. COTTAM
BEEHIVE ENTRANCE
Filed July 19, 1923
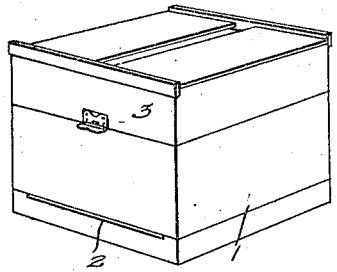
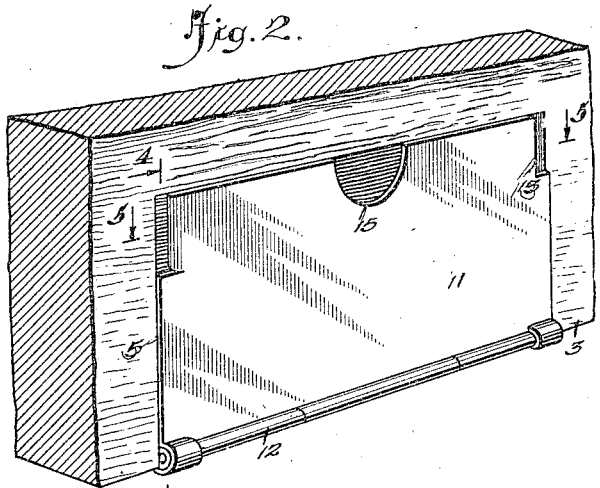
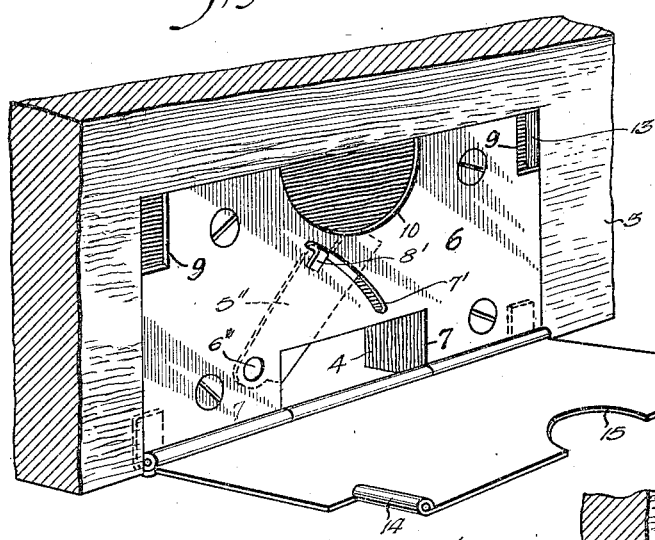
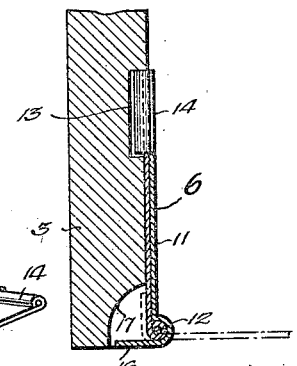
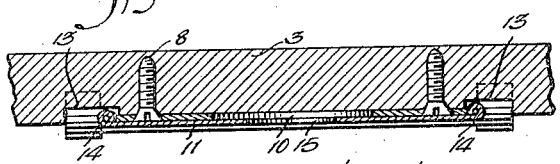
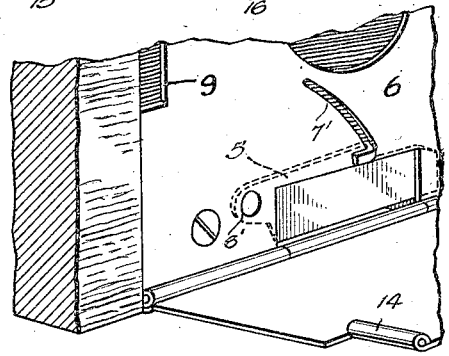
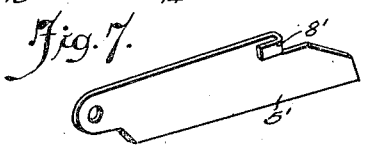
INVENTOR
J.B. COTTAM
ATTORNEYS Patented Apr. 29, 1924.

1,492,429

UNITED STATES PATENT OFFICE.

JOHN BENEDICT COTTAM, OF SANTA BARBARA, CALIFORNIA.

BEEHIVE ENTRANCE.

Substitute for application Serial No. 605,225, filed December 6, 1922. This application filed July 19, 1923. Serial No. 652,653.

*To all whom it may concern:*

Be it known that I, JOHN BENEDICT COTTAM, a citizen of the United State, and a resident of Santa Barbara, in the county of Santa Barbara and State of California, have invented a new and Improved Beehive Entrance, of which the following is a full, clear, and exact description.

This invention relates to improvements in beehive entrances, and is a substitute for my application Serial No. 605,225, filed December 6, 1922, an object of the invention being to provide improved means for permitting the entrance of bees directly into the super independent of the main or brood chamber entrance during the honey flow and for additional ventilation.

A further object is to provide an entrance of this character which may be closed after honey flow is over, or during honey flow should robbers be present.

A still further object is to provide a combined door and alighting platform for the entrance.

Another object is to provide an entrance of this character which is simple and practical in construction, neat and attractive in appearance, efficient in use, and one which will promote increased production of honey during honey flow.

With these and other objects in view, the invention consists in certain novel features of construction and combinations and arrangements of parts as will be more fully hereinafter described and pointed out in the claims.

In the accompanying drawings—

Figure 1 is a perspective view of a beehive showing the position of my improved entrance;

Figure 2 is an enlarged perspective view of the entrance showing the same closed;

Figure 3 is a similar view showing the entrance open;

Figure 4 is a view in section on the line 4—4 of Figure 2, the dotted lines indicating the position of the door when it is swung to horizontal position to form an alighting platform;

Figure 5 is a view in section on the line 5—5 of Figure 2.

Figure 6 is a detail perspective view showing the gate for closing the opening in the wall of the super;

Figure 7 is a detail perspective view of the gate.

Referring in detail to the drawings, I have illustrated at 1, a beehive provided adjacent its lower end with the usual entrance 2 into the brooding chamber. The invention in this case resides in the novel form of super entrance which is located above the entrance 2 and permits the bees to enter directly into the super without passing through the brooding chamber. It will be seen that one wall 3 of the super is formed with an opening 4 therethrough and around this opening a recess or cutaway portion 5 is provided in the outer face of the wall. A metal plate 6 fits within this recess and is provided with an opening 7, exposing the entrance opening 4. The opening 7 is adapted to be closed by a swinging gate 5' pivotally mounted as at 6', and adapted to swing across the opening 7. The metal plate 6 is provided with a slot 7', and the gate 5' is formed with a projection 8' which occupies a position in said slot and forms the means for swinging the gate about its pivotal point 6'. The plate may be secured to the wall of the super by any appropriate securing devices such as 8, and is formed with angular recesses 9 in its upper corners, and with a relatively large semi-circular recess 10 in its upper edge for a purpose which will more fully hereinafter appear.

I have used the reference numeral 11 to designate a door hingedly connected to the plate 6 by any suitable hinge 12 and adapted to swing downwardly and outwardly. The wall of the super is countersunk, as indicated at 13, behind the recesses 9 in the plate 6 to accommodate spring clips 14 carried by the upper corners of the door 11 and engageable in the recesses 9 to hold the door against accidental opening. A semi-circular recess 15 in the upper edge of the door 11 registers with and is appreciably smaller than the recess 10 in the plate 6.

Angular extensions 16 at the lower corners of the door 11 are movable in recesses 17 in the wall of the super and are engageable with the rear face of the plate 6 to limit the outward swinging movement of the door 11 and to hold the same in horizontal position.

The door may be conveniently supported in horizontal position, as seen in Figure 3, and in dotted lines in Figure 4, to expose the entrance opening 4 and to form an alighting platform for the bees, or may be swung to vertical position and automatically locked by the clips 14 when it becomes expedient to close said opening. The difference in size between the recesses 10 and 15 in the upper edges of the plate and door respectively, permits the ready insertion of a suitable tool to pry the door open. The many advantages of an entrance of this kind will be readily apparent to the trade.

Although I have illustrated one of the preferred embodiments of my invention, it will be evident that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

What is claimed is:

1. The combination with a beehive having an entrance opening therein, of a door normally closing said opening, means for holding said door in a horizontal position to form an alighting platform, and interengaging means on the hive and door for locking said door in closed position.

2. The combination with a beehive having an entrance opening therein, of a door normally closing said opening, means for holding said door in a horizontal position to form an alighting platform, means for locking said door in closed position, said last-mentioned means including spring clips carried by the door, and devices engageable with the clips upon closing of the door.

3. The combination with a beehive having an entrance opening therein and provided with recesses, of a plate secured to the outside of the hive and having a recess therein exposing said opening and recesses in its upper corners registering with the recesses of the hive, and a door hingedly connected to the lower edge of the plate and adapted to swing outwardly, said door being provided with spring clips adapted to engage the recesses of the plate.

4. The combination with a beehive having an entrance opening therein, of a plate secured to the outside of the hive and having a recess therein exposing said opening, a door hingedly connected to the lower edge of the plate and adapted to swing outwardly, the wall of said hive having recesses therein adjacent the lower corners of the plate, angular extensions carried by the lower edge of the door movable in said recesses and engageable with the rear face of the plate to hold the door in horizontal position.

5. The combination with a beehive having an entrance opening therein, of a plate secured to the outside of the hive and having a recess therein exposing said opening, a door hingedly connected to the lower edge of the plate and adapted to swing outwardly, said plate and door having registering recesses therein, and the recess in said door being smaller than the recess in said plate, whereby to permit the insertion of a tool for opening the door.

6. The combination with a beehive having an opening therein, a plate having an entrance opening and adapted to close the opening in the hive, a pivoted member for closing the entrance opening in said plate, and a hinged door pivotally mounted in such a manner that in one position it closes the opening in the hive and in the other position it forms an alighting platform.

7. In combination with a hive having an open side, a slotted plate having an entrance opening, a gate member pivotally mounted on said plate and adapted to close said entrance opening, and a tongue member projecting from said gate member, said tongue member operating in the slot of the slotted member.

JOHN BENEDICT COTTAM.